United States Patent
Chase et al.

(10) Patent No.: US 8,429,421 B2
(45) Date of Patent: Apr. 23, 2013

(54) SERVER-SIDE ENCRYPTED PATTERN MATCHING

(75) Inventors: Melissa E. Chase, Seattle, WA (US); Emily H. Shen, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 12/972,285

(22) Filed: Dec. 17, 2010

(65) Prior Publication Data

US 2012/0159180 A1 Jun. 21, 2012

(51) Int. Cl.
*G06F 11/30* (2006.01)
*G06F 12/14* (2006.01)

(52) U.S. Cl.
USPC ........... 713/189; 713/190; 713/191; 713/192; 713/193; 713/194; 380/277

(58) Field of Classification Search .................. 713/183, 713/189–194; 380/277
See application file for complete search history.

(56) References Cited

U.S. PATENT DOCUMENTS

| | | | |
|---|---|---|---|
| 5,442,699 A * | 8/1995 | Arnold et al. .................. | 713/188 |
| 5,953,006 A * | 9/1999 | Baker et al. .................... | 715/700 |
| 6,239,727 B1 * | 5/2001 | Crochemore et al. .......... | 341/51 |
| 7,068,787 B1 * | 6/2006 | Ta et al. ......................... | 380/240 |
| 7,260,215 B2 | 8/2007 | Troyansky et al. | |
| 7,512,814 B2 * | 3/2009 | Chen et al. ..................... | 713/193 |
| 2005/0175176 A1 | 8/2005 | Venkatesan et al. | |
| 2006/0041543 A1 | 2/2006 | Achlioptas | |
| 2007/0195959 A1 | 8/2007 | Clarke | |
| 2007/0271465 A1 | 11/2007 | Wu | |
| 2008/0071818 A1 * | 3/2008 | Apanowicz et al. .......... | 707/101 |
| 2009/0077378 A1 | 3/2009 | Hacigumus et al. | |

OTHER PUBLICATIONS

Barak, et al., "On the (Im)possibility of Obfuscating Programs". Advances in Cryptology, CRYPTO 2001, 21st Annual International Cryptology Conference, 2001, vol. 2139 of Lecture Notes in Computer Science, 2001, version retrieved at <<http://www.iacr.org/archive/crypto2001/21390001.pdf>>, Aug. 2001, 18 pages.

Bellare, et al., "Incremental Cryptography and Application to Virus Protection", retrieved at <<http://cseweb.ucsd.edu/users/mihir/papers/inc2.pdf>>, STOC '95: Proceedings of the Twenty-Seventh Annual ACM Symposium on Theory of Computing, May 29-Jun. 1, 1995, 15 pages.

Bhattacharyya, "Prefix Tree with Encryption of Data and Itemsets", 13th International Conference on Management of Data (COMAD 2006), Dec. 2006, 4 pages.

(Continued)

*Primary Examiner* — Jeffrey Pwu
*Assistant Examiner* — Jayesh Jhaveri
(74) *Attorney, Agent, or Firm* — Lee & Hayes, PLLC

(57) ABSTRACT

Server-side encrypted pattern matching may minimize the risk of data theft due to server breach and/or unauthorized data access. In various implementations, a server for performing the server-side encrypted pattern matching may include an interface component to receive an encrypted query token. The server may further include a query component to find a match for the encrypted query token in the encrypted data string. The query component may find such a match without decrypting the encrypted data string and the encrypted query token by using an encrypted dictionary that includes information on the edges of the encrypted suffix tree.

20 Claims, 7 Drawing Sheets

OTHER PUBLICATIONS

Black, et al., "Ciphers with Arbitrary Finite Domains", retrieved at <<http://www.cs.ucdavis.edu/~rogaway/papers/subset.pdf>>, Proceedings of the Cryptographer's Track at the RSA Conference on Topics in Cryptology, Lecture Notes in Computer Science, vol. 2271, Feb. 2002, 17 pages.

Blelloch, et al., "Strongly History-Independent Hashing with Applications", retrieved at <<http://www.cs.cmu.edu/~dgolovin/papers/focs07.pdf>>, Proceedings of the 48th Annual IEEE Symposium on Foundations of Computer Science (FOCS '07), Oct. 2007, 11 pages.

Blelloch, et al., "Uniquely Represented Data Structures for Computational Geometry", retrieved at <<http://www.math.ias.edu/~virgi/urtechreport.pdf, School of Computer Science, Carnegie Mellon University, Pittsburgh, PA, Report No. CMU-CS-08-115, Apr. 2008, 26 pages.

Buchbinder, et al., "Lower and Upper Bounds on Obtaining History Independence", retrieved at <<www.cs.technion.ac.il/~erez/Papers/Buchbinder-Petrank.ps>>, Information and Computation, vol. 204, No. 2, Feb. 2006, 42 pages.

Camenisch, et al., "Simulatable Adaptive Oblivious Transfer", retrieved at <<http://www.cs.virginia.edu/papers/ CNS07.pdf>>, EUROCRYPT '07: Proceedings of the 26th Annual International Conference on Advances in Cryptology, May 2007, 25 pages.

Canetti, et al., "Extractable Perfectly One-way Functions", retrieved at <<http://crypto.stanford.edu/portia/papers/CanettiExtractable.pdf>>, Automata, Languages and Programming, 35th International International Colloquium on Automata, Languages and Programming (ICALP '08), vol. 5126 of Lecture Notes in Computer Science, Jul. 2008, 12 pages.

Canetti, et al., "Obfuscating Point Functions with Multibit Output", retrieved at <<http://crypto.stanford.edu/portia/papers/eurocrypt2008.pdf, Advances in Cryptology, EUROCRYPT 2008, vol. 4965 of Lecture Notes in Computer Science, Apr. 2008, 20 pages.

Canetti, et al., "Perfectly One-way Probabilistic Hash Functions", retrieved at <<http://cseweb.ucsd.edu/users/daniele/papers/CMR.pdf>>, ACM Symposium on Theory of Computing (STOC 1998), May 1998, 10 pages.

Canetti, "Towards Realizing Random Oracles: Hash Functions that Hide All Partial Information", retrieved at <<www.research.ibm.com/ security/pof-long.ps>>, Proceedings CRYPTO '97, Lectures Notes in Computer Science, No. 1294, Aug. 1997, 19 pages.

Cheng, et al., "Privacy Preserving Keyword Searches on Remote Encrypted Data", retrieved at <<http://www.eecs.harvard.edu/~michaelm/postscripts/acns2005.pdf>>, Applied Cryptography and Network Security (ACNS '05), vol. 3531 of Lecture Notes in Computer Science, Jun. 2005, 14 pages.

Curtmola, et al., "Searchable Symmetric Encryption: Improved Definitions and Efficient Constructions", retrieved at <<http://eprint.iacr.org/2006/210.pdf>>, ACM Conference on Computer and Communications Security (CCS'06), Oct. 30-Nov. 3, 2006, 26 pages.

Dodis, et al., "Entropic Security and the Encryption of High Entropy Messages", retrieved at <<http://eprint.iacr.org/2004/219.pdf>>, Cryptology ePrint Archive, Report 2004/219, Sep. 1, 2004, 22 pages.

Garay et al., "Practical and Secure Solutions for Integer Comparison", In Public Key Cryptography (PKC '07), vol. 4450 of Lecture Notes in Computer Science, Springer-Verlag, Apr. 2007. pp. 330-342.

Giereth, "On Partial Encryption of RDF-Graphs", retrieved at <<http:// www.vis.uni-stuttgart.de/ger/research/pub/pub2005/iswc05-giereth.pdf>>, ISWC 2005, LNCS 3729, Oct. 2005, pp. 308-322.

Giereth, "PRE4J—A Partial RDF Encryption API for Jena", retrieved at <<http://jena.hpl.hp.com/juc2006/proceedings/giereth/paper.pdf>>, Proceedings of 1st Jena User Conference, May 2006, 9 pages.

Goh, "Secure indexes", retrieved at <<http://eprint.iacr.org/2003/216.pdf>>, Technical Report 2003/216, IACR ePrint Cryptography Archive, Mar. 16, 2004, 18 pages.

Hada, "Zero-Knowledge and Code Obfuscation", retrieved at <<http://www.iacr.org/cryptodb/archive/2000/ASIACRYPT/19760443.pdf>>, Advances in Cryptology, ASIACRYPT '00, vol. 1976 of Lecture Notes in Computer Science, Dec. 2000, pp. 443-457.

Halloush et al., "Global Heuristic Search on Encrypted Data (GHSED)",International Journal of Computer Science Issues (IJCSI), vol. 2, Aug. 2009, pp. 13-17.

Harrower, "Searching Encrypted Data", retrieved on Oct. 21, 2010 at <<http://www.doc.ic.ac.uk/teaching/distinguished-projects/2009/w.harrower.pdf>>,Imperial College—London, Department of Computing, Jun. 15, 2009, 76 pages.

Hartline, et al., "Characterizing History Independent data structures", retrieved at <<http://www.coder.com/~hartline/papers/hist-indep-ISAAC-02.pdf>>, Proceedings of the 13th International Symposium on Algorithms and Computation (ISAAC '02), Nov. 2002, 12 pages.

Hofheinz, et al., "Obfuscation for Cryptographic Purposes", retrieved at <<eprint.iacr.org/2006/463.ps>>, Theoretical Cryptography Conference (TCC '07), vol. 4392 of Lecture Notes in Computer Science, Feb. 2007, 27 pages.

Hohenberger, et al., "Securely Obfuscating Re-encryption", retrieved at <<http://www.cs.jhu.edu/~susan/papers/HRSV07.pdf>>, Theoretical Cryptography Conference (TCC '07), vol. 4392 of Lecture Notes in Computer Science, Feb. 2007, 20 pages.

Hsu et al., "Homomorphic Encryption-based Secure SIFT for Privacy-Preserving Feature Extraction", retrieved on Oct. 21, 2010 at <<http://www.iis.sinica.edu.tw/page/library/TechReport/tr2010/tr10006.pdf>>,Jul. 12, 2010, 13 pages.

Kamara, "Computing Securely with Untrusted Resources", doctoral thesis, Johns Hopkins University, Apr. 2008, 148 pages.

Li et al., "Enabling Efficient Fuzzy Keyword Search over Encrypted Data in Cloud Computing", retrieved on Oct. 21, 2010 at <<http://eprint.iacr.org/2009/593.pdf>>, Cryptology ePrint Archive: Report 2009/593, Dec. 2009, 16 pages.

Lynn, et al., "Positive Results and Techniques for Obfuscation", retrieved at <<http://eprint.iacr.org/2004/060.pdf>>, Advances in Cryptology, EUROCRYPT '04, vol. 3027 of Lecture Notes in Computer Science, May 2004, 18 pages.

Micali, et al., "Zero-Knowledge Sets", retrieved at <<http://portal.acm.org/citation.cfm?id=946305>>, Proceedings of the 44th Annual IEEE Symposium on Foundations of Computer Science (FOCS '03), Oct. 2003, 12 pages.

Micciancio, "Oblivious Data Structures: Applications to Cryptography," retrieved at <<http://cseweb.ucsd.edu/~daniele/papers/OblTree.pdf>>, STOC '97: Proceedings of the Twenty-Ninth Annual ACM symposium on Theory of Computing, May 1997, 19 pages.

Morris, et al., "How to Encipher Messages on a Small Domain: Deterministic Encryption and the Thorp Shuffle", retrieved at <<http://www.cs.ucdavis.edu/~rogaway/papers/thorp.pdf>>, Advances in Cryptology, CRYPTO 2009, Lecture Notes in Computer Science, vol. 5677, Aug. 2009, 19 pages.

Naor, et al.,"Anti-presistence: History Independent Data Structures", retrieved at <<http://ww2.cs.mu.oz.au/~vteague/STOC01.pdf>>, STOC '01: Proceedings of the Thirty-Third Annual ACM Symposium on Theory of Computing, Jul. 2001, 16 pages.

Naor, et al., "Certificate Revocation and Certificate Update", retrieved at <<http://wisdomarchive.wisdom.weizmann.ac.il:81/archive/00000112/>>, Proceedings of the 7th Conference on USENIX Security Symposium, Jan. 1998, 20 pages.

Narayanan, et al., "Obfuscated Databases and Group Privacy", retrieved at <<http://www.cs.utexas.edu/~shmat/shmat_ccs05obfusc.pdf>>, CCS '05: Proceedings of the 12th ACM Conference on Computer and Communications Security, Nov. 2005, 10 pages.

Ogata, et al., "Oblivious Keyword Search", retrieved at <<http://eprint. iacr.org/2002/182.pdf>>, Journal of Complexity, vol. 20, No. 2-3, Apr.-Jun. 2004, pp. 356-371.

Oleshchuk, "Privacy Preserving Pattern Matching on Remote Encrypted Data", 4th IEEE Workshop on Intelligent Data Acquisition and Advanced Computing Systems: Technology and Applications (IDAACS 2007), Sep. 2007, pp. 609-613.

Ustimenko, et al. "Cryptall: System to Encrypt all Types of Data", retrieved at retrieved at <<http://www.library.ukma.kiev.ua/e-lib/

NZ/ NZV23_2004_phizykmatem/03_ustymenko_vo.pdf>>, Notices of Kiev-Mohyla Academy, Jun. 23, 2004, 4 pages.

Ustimenko, "Teaching Cryptography with 'Mathematica'", retrieved at <<http://math.arizona.edu/~atp-mena/conference/presentations/Ustimenko.pdf>>, University of Maria Curie Sklodowska, Poland, Mar. 26, 2007, 15 pages.

Wang et al., "Efficient Secure Query Evaluation over Encrypted XML Databases", Proceedings of the 32nd international conference on Very Large Data Bases (VLDB '06), Sep. 2006, pp. 127-138.

* cited by examiner

SERVER-SIDE ENCRYPTED PATTERN MATCHING

BACKGROUND

A pattern matching query takes a data string and a query pattern string, and determines whether the pattern of the query pattern string occurs as a substring of the data string. For example, the data string may be a genome sequence and the query pattern string may be a particular sequence of genetic code. A pattern matching query may be performed on data strings that are stored on one or more cloud servers. Often, large and important data strings are stored on such cloud servers because these servers offer virtually limitless storage capacity and robust data backup protection again data loss. Nevertheless, cloud servers may be vulnerable to unauthorized access and the data strings stored on these cloud servers may be compromised or stolen. Thus, a user who owns the data strings may desire to store the data strings as encrypted data on a cloud server, so that the data is protected even when a cloud server is compromised by a malicious attack or unauthorized access.

However, in order to perform pattern matching query on an encrypted data string, the user is generally faced with two equally undesirable choices. One of such choices is to reveal the encryption key used to encrypt the data string to a cloud server, so that the encrypted data string may be decrypted at the server for pattern matching comparison. However, the revelation of the encryption key to the cloud server may provide a malicious perpetrator who has access to the cloud server with the ability to decrypt and steal the data. The other undesirable choice is to download the entire encrypted data string to a client device, then decrypt the encrypted data string and perform the pattern matching query on the decrypted data string at the client device. However, such an approach may be time consuming and inefficient for the purpose of generating pattern matching query results. Further, such an approach is unavailable for data strings that are larger than the storage capacity of the client device.

SUMMARY

Described herein are techniques for efficiently performing pattern matching queries directly on encrypted data strings that are stored on one or more cloud servers. Thus, the techniques eliminate the reliance on the downloading of the encrypted data strings from the cloud servers to a client device, and performing the pattern matching queries using the client device. Further, the techniques may enable the pattern matching queries to be performed on the encrypted data string at the cloud servers without revealing sensitive information to the cloud servers. For example, the pattern matching queries may be performed without revealing the encryption keys to the cloud servers, and further without the cloud servers learning the query pattern strings of the pattern matching queries.

In this way, the techniques may enable the owners of the data strings to benefit from the virtually limitless storage capacity and data backup protection of the cloud servers to store data strings while minimizing the risk of data theft due to server breach and/or unauthorized data access. The techniques may leverage the use of an encrypted suffix tree, as well as an encrypted dictionary that stores information related to the edges of the encrypted suffix tree, to produce pattern matching results for the encrypted query pattern strings.

In some embodiments, one or more cloud servers for performing the server-side encrypted pattern matching may include an interface component to receive an encrypted query token. The server may further include a query component to find a match for the encrypted query token in the encrypted data string. The query component may find such a match without decrypting the encrypted data string and the encrypted query token by using an encrypted dictionary that includes information on the edges of the encrypted suffix tree.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The techniques described herein may enable pattern matching queries to be performed directly on data strings that are stored on one or more servers of a computing cloud. The techniques may enable the pattern matching queries to be performed on the encrypted data string at the cloud servers without revealing the encryption keys to the cloud servers, and further without the cloud servers learning the query pattern strings of the pattern matching queries.

In various implementations, the techniques may leverage the use of an encrypted suffix tree, as well as an encrypted dictionary that stores information related to the edges of the encrypted suffix tree, to produce pattern matching results for encrypted query pattern strings. Accordingly, the techniques may enable the owners of the data strings to leverage the virtually limitless storage capacity and data backup protection of the cloud servers to store data strings while minimizing the risk of data theft due to server breach and/or unauthorized data access. Various example implementations of the server-side encrypted pattern matching techniques are described below with reference to FIGS. 1-7.

Illustrative Environment

Figure 1:
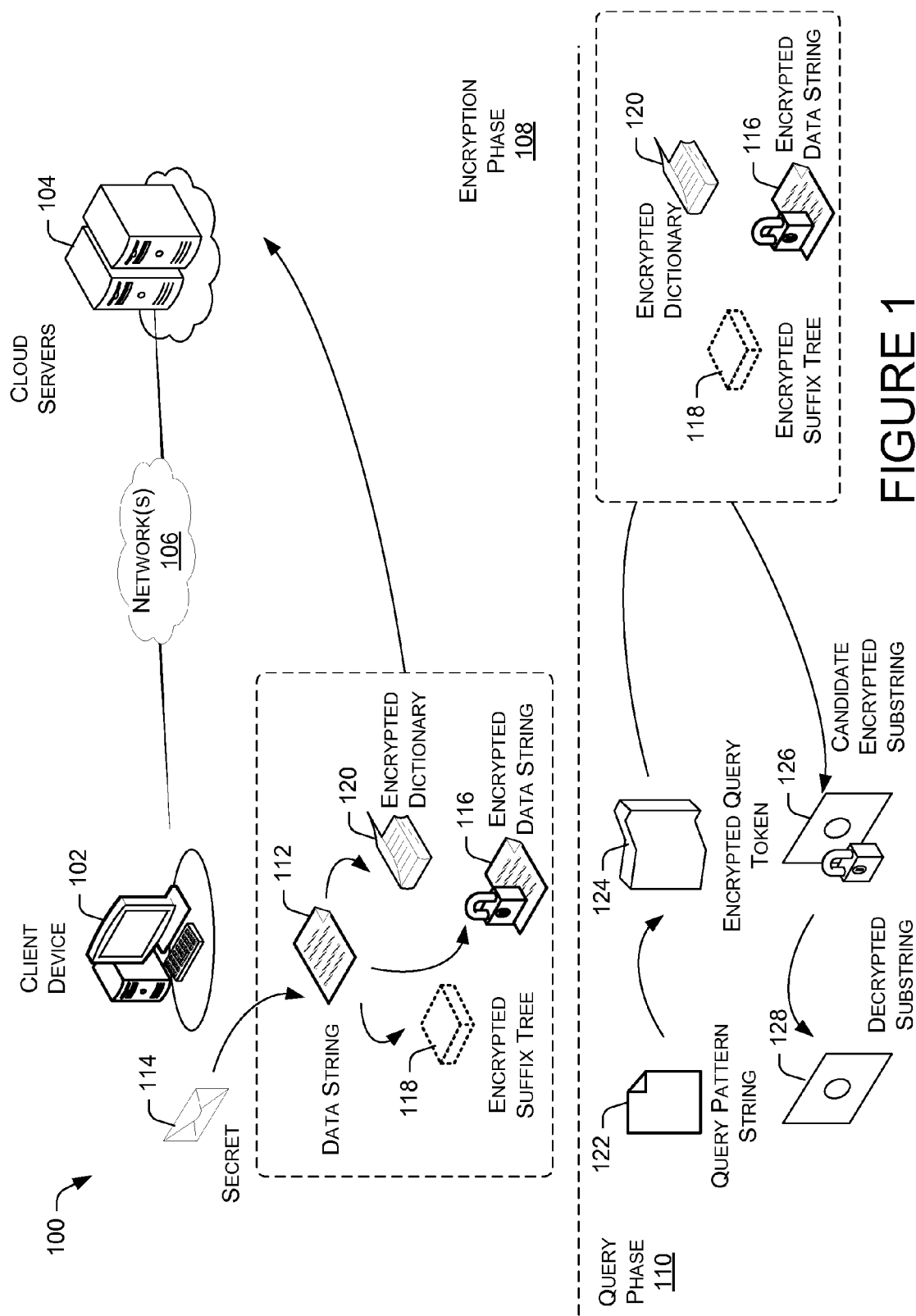
FIG. 1 is a schematic diagram of an illustrative environment for implementing server-side encrypted pattern matching.

FIG. 1 is a schematic diagram of an illustrative environment 100 for implementing server-side encrypted pattern matching. The server-side encrypted pattern matching techniques may be implemented using a client device 102 and one or more servers 104 of a computing cloud. In various embodiments, the cloud servers 104 may be located in a single data center of the computing cloud, or distributed across a plurality of data centers of the computing cloud.

The cloud servers 104 may be connected to a client device 102 by a network 106. The network 106 may be a local area network ("LAN"), a larger network such as a wide area network ("WAN"), and/or a collection of networks, such as the Internet. Protocols for network communication, such as TCP/IP, may be used to implement the one or more networks 106.

The implementation of the server-side encrypted pattern matching may include two phases: an encryption phase 108 and a query phase 110. During the encryption phase 108, the client device 102 may encrypt a data string 112 that is to be stored on the cloud server 104 based on a secret 114 to generate an encrypted data string 116. The data string 112 may include any data that is represented by any string of symbols (e.g., alphanumeric characters, string of words, etc.). For example, the data string 112 may be a genetic code that is represented by a string of repeating character, such as "ATG-GCGTACAAA".

During the encryption of the data string 112, the client device 102 may also generate a corresponding encrypted suffix tree 118 for the data string 112. Generally speaking, a suffix tree of a particular data string is a data structure that presents suffixes of the particular data string in a way that enables string operations, such as pattern matching queries, to be quickly and efficiently performed on the particular data string. A pattern matching query is a query to locate a particular pattern, also known as a substring, in a data string. For instance, a pattern matching query for the pattern string "GCG" on the example data string "ATGGCGTACAAA" described above would locate the substring "GCG" in the example data string, whereas a query for the pattern string "AAC" in the above example data string would return a response that the pattern is not found. The encrypted nature of the suffix tree 118 means that unlike an ordinary suffix tree, the data contained in the encrypted suffix tree 118 is not readable without access to the secret 114.

The client device 102 may further generate an encrypted dictionary 120 during the encryption phase 108 that stores information related to the edges in the encrypted suffix tree 118. At the end of the encryption phase 108, the encrypted data string 116, the encrypted suffix tree 118, and the encrypted dictionary 120 are sent to the one or more cloud servers 104 for storage via the network 106.

During the query phase 110, the client device 102 may receive a query pattern string 122 from a user of the client device 102. In turn, the client device 102 may encrypt the received query pattern string 122 into an encrypted query token 124 for submission to the cloud servers 104. At the cloud servers 104, the encrypted query token 124 may be evaluated based on the encrypted dictionary 120. The evaluated encrypted query token 124 is then used by the cloud servers 104 to traverse the encrypted dictionary 120 that stores information on the edges of the encrypted suffix tree 118 for locating one or more matching encrypted substrings that are in the encrypted data string 116.

Subsequently, the cloud servers 104 may return a potential candidate encrypted substring 126 to the client device 102 if such a substring exists in the encrypted data string 116. Otherwise, the cloud servers 104 may return a response to the client device 102 that indicates no substring corresponding to the query pattern string 122 is found in the encrypted data string 116. The client device 102 may present the response to a user of the client device 102 who provided the query pattern string 122. In various embodiments, the cloud servers 104 may perform the evaluation of the encrypted query token 124 and the traverse of the encrypted dictionary 120 that stores information on the edges of the encrypted suffix tree 118 without actually having access to the secret 114.

Upon the return of the candidate encrypted substring 126 to the client device 102, the client device 102 may decrypt the candidate encrypted substring 126 using the secret 114 to produce the decrypted substring 128, and verify that the decrypted substring 128 matches the query pattern. If the decrypted substring 128 matches the query pattern, then the client device 102 may present the matching result to the user of the client device 102.

Collectively, the client device 102 and the cloud servers 104 may use two encryption schemes to perform the encryption phase 108 and the query phase 110. The two encryption schemes include (1) a symmetric key encryption scheme and (2) an integer comparison encryption scheme, and the resulting algorithms are referred to as a symmetric key pattern matching encryption scheme.

The symmetric key pattern matching scheme enables a user of the client device 102 who has a secret key to encrypt a string s, such as the data string 112, and create tokens for patterns (strings) p that may be used to query the string s for the occurrence, if any, of the pattern p as a substring of s. In at least one embodiment, the symmetric key encryption scheme may include the use of a (1) generation algorithm, (2) a tokenization scheme, (3) an encryption algorithm, (4) a query algorithm, and (4) a verification algorithm.

Accordingly, assuming that E denotes a finite alphabet, then the generation algorithm may be described as $Gen(1^k)$: a probabilistic algorithm that takes a security parameter k and outputs a secret key K. The encryption algorithm may be described as Token(K,p): a (possibly probabilistic) algorithm that takes a secret key K and a pattern $p \in \Sigma^*$ and outputs a token TK. The encryption algorithm may be described as Enc(K,s): a probabilistic algorithm that takes a secret key K and a string $s \in \Sigma^*$ and outputs a ciphertext CT. The query algorithm may be described as Query(TK, CT): a deterministic algorithm that takes a token TK and a ciphertext CT, and outputs a value (which we call an "answer") A. The verification algorithm may be described as Verify(K,A,p): a deterministic algorithm that takes a secret key K, an answer A, and a pattern p, and outputs an integer j.

The integer comparison encryption scheme, such as a CQA2-secure integer comparison encryption scheme ($\epsilon_{comp}$), may facilitate the generation and the use of the encrypted dictionary 120 in conjunction with the symmetric key encryption scheme. In at least one embodiment, the integer comparison scheme may be implemented using a generation algorithm, a tokenization algorithm, an extraction algorithm, an encryption algorithm, and a decryption algorithm.

Accordingly, assuming that $\mathcal{M}$ is a message space, then the generation algorithm may be described as $Gen(1^k)$: generates a random k-bit (secret key) string K. The tokenization algorithm may be described as Token(K,x): a (possibly probabilistic) algorithm that takes a secret key K and an integer $x \in \mathbb{N}$ and outputs a token TK. The extraction algorithm may be described as Extract($TK_x$,x'): a (possibly probabilistic) algorithm that takes a token for $x \in \mathbb{N}$ and an integer x'>x and outputs a token for x'. The encryption algorithm may be described as Enc(K,M,l): a probabilistic algorithm that encrypts a message $M \in \mathcal{M}$ under integer $l \in \mathbb{N}$ using the secret key SK. The decryption algorithm may be described as Dec(TK,CT): a deterministic algorithm that takes a token TK for some x, and a ciphertext CT, for some x' and outputs a message $M \in \mathcal{M}$ if x=x', and fails if not.

In various embodiments, the CQA2-secure integer comparison encryption scheme ($\epsilon_{comp}$) may use a hash function H: $\{0,1\}^* \rightarrow \{0,1\}^k$. Accordingly, for any $x \in \mathbb{N}$ and $K \in \{0,1\}^*$, assume $H^x(K)$ denotes the result of x successive applications of H to K, the functions of the algorithms of $\epsilon_{comp}$ may be expressed as: Gen($1^k$): Output a random k-bit string K; Token(K,x): Output $H^x(K)$; Extract($TK_x$,x'): Output $H^{x'-x}(TK_x)$; Enc(K,M,l): Output $M \oplus H^l(K)$; and Dec(TK, CT): Output $TK \oplus CT$.

Example Client Device

Figure 2:
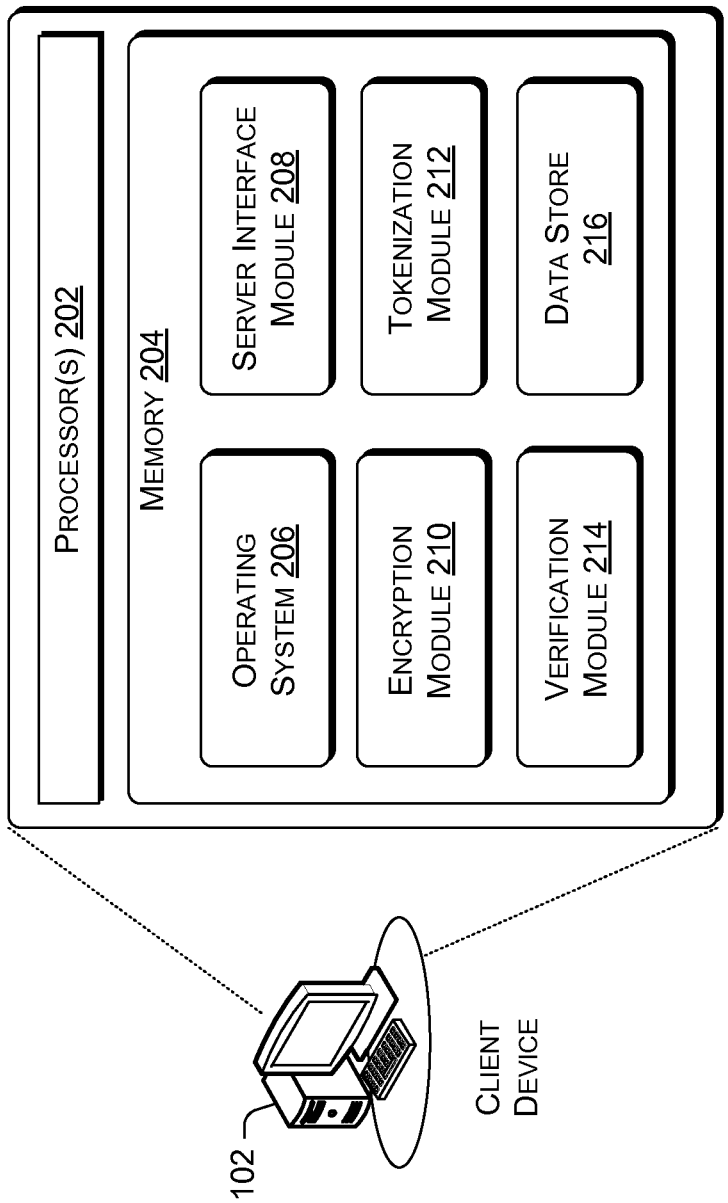
FIG. 2 is a block diagram that illustrates selected components of the client device that performs client-side tasks that facilitates the server-side encrypted pattern matching.

FIG. 2 is a block diagram that illustrated selected components of the client device 102 that performs client-side tasks for facilitating server-side encrypted pattern matching. The client device 102 may be a desktop computer, a laptop computer, a server, a personal digital assistant (PDA), a smart phone, a set-top box, an Internet appliance, a game console, and/or other types of electronic devices. The client device 102 may includes one or more processors 202, memory 204, and/or user controls that enable a user to interact with the device.

The memory 204 may be implemented using computer storage media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The client device 102 may also include a network interface that enables the client device 102 to communicate with other computing devices, such as the cloud server 104, via the network 106. Computer-readable media includes, at least, two types of computer-readable media, namely computer storage media and communications media.

The user controls of the client device 102 may include, but are not limited to, combinations of one or more of keypads, keyboards, mouse devices, touch screens, microphones, speech recognition packages, and any other suitable devices or other electronic/software selection methods.

The memory 204 of the client device 102 may store an operating system 206. The operating system 206 may include components that enable the client device 102 to receive data via various inputs (e.g., user controls, network interfaces, and/or memory devices), and process the data using the one or more processors 202 to generate output. The operating system 206 may include one or more components that present the output (e.g., display an image on an electronic display, store data in memory, transmit data to another electronic device, etc.). Additionally, the operating system 206 may include other modules that perform various other functions generally associated with an operating system. The memory 204 may also store a server interface module 208, an encryption module 210, a tokenization module 212, a verification module 214, and a data store 216.

The encryption module 210 encrypts the data string 112, as well as generates the encrypted suffix tree 118 and the encrypted dictionary 120 for upload to the cloud servers 104.

The data string 112 may be inputted onto the client device 102 by a user of the client device 102. Accordingly, assuming that F: $\{0,1\}^k \times \{0,1\}^* \rightarrow \{0,1\}^*$ is a pseudorandom function family, $\epsilon$=(Gen,Enc,Dec) is a symmetric key encryption scheme, and $\epsilon_{comp}$=(Gen,Token,Extract,Dec) is an integer comparison encryption scheme, then the encryption module 210 may generate a secret key and encrypt the data string 112, and generate the encrypted suffix tree 118 and the encrypted dictionary 120 as follows:

Gen($1^k$): Generate random k-bit strings $K_1$, $K_2$, $K_3$, a key $K_4 \rightarrow \epsilon \cdot \text{Gen}(1^k)$. Set $K=(K_1, K_2, K_3, K_4)$. The encryption module 210 performs this function to generate the secret key for encrypting the data string, in which the secret key includes a set of multiple (e.g., four) random k-bit key strings.

Enc(K,s): To encrypt a string $s = s_1 \ldots s_n$, such as the data string 112, the encryption module 210 may first construct an encrypted suffix tree, such as the encrypted suffix tree 118, for s (first adding a \$ symbol to the end of s if necessary to ensure that no suffix of s is a prefix of another suffix of s). For any edge e in the suffix tree, let $p_e$ denote the string on the path from the root to e, and let $e_i$ denote the ith letter of the string on edge e, and let $\text{ind}_e$ denote the start index position in s of the first occurrence of the substring $p_e \| e$.

The encryption module 210 may construct a dictionary D, i.e., encrypted dictionary 120, by ignoring \$ symbols (i.e., not including edges consisting solely of the \$ symbol, and not including an ending \$ symbol on any edge), and for each edge e in the suffix tree, store an encrypted record that includes the following values:

$$((|p_e\|e|+1) \oplus F_{K_2}(p_e\|e_1), \epsilon_{comp} \cdot \text{Enc}(F_{K_3}(p_e\|e_1), \text{ind}_e, |e|))$$

in D with search key $F_{K_1}(p_e\|e_1)$, in which $F_{K_1}(p_e\|e_1)$ is a pseudorandom function applied to a prefix up through the first letter of the edge, and the values are an encryption of a length of the prefix through the edge, and the encryption of the index position of the first occurrence of a corresponding substring to the edge, respectively. Accordingly, the encryption module 210 may generate an encrypted dictionary (e.g., encrypted dictionary 120), that stores information on the edges of the corresponding encrypted suffix tree 118. In other words, the encryption module 210 may construct an encrypted dictionary 120 that stores the values for the edges of the corresponding encrypted suffix tree 118. In this way, any subsequent queries that are to be performed using the encrypted suffix tree 118 may instead be performed using the encrypted dictionary 120. Thus, the efficiency of query operations may be enhanced with the use of the encrypted dictionary 120 in place of the encrypted suffix tree 118. However, in other embodiments, queries may be performed using the encrypted suffix tree 118 even in the absence of the encrypted dictionary 120.

Further, assuming that $|\{e\}|$ denote the number of edges in the encrypted suffix tree, then the encryption module 210 may add $2n-|\{e\}|$ "dummy" entries to D, so that D contains 2n entries. Thus, for each dummy entry, the encryption module 210 may choose random strings $R_1$, $R_2$, $R_3$, $R_4$ and store ($R_2$, $\epsilon_{comp} \cdot \text{Enc}(R_3, R_4, 1)$) with a search key $R_1$. The encryption module 210 performs this function to obfuscate information on the number of real edges of the encrypted suffix tree 118.

Finally, the encryption module 210 may encrypt s symbolwise under $\epsilon$, in which for i=1, ..., n, let $c_i = \epsilon \cdot \text{Enc}(K_4, s_i)$. Accordingly, the encryption module 210 outputs CT=(C,D), where $C=(c_1, \ldots, c_n)$. In other words, the encryption module 210 may output a ciphertext in the form of the encrypted data string 116 that is an encrypted form of the data string 112. Subsequently, the encryption module 210 may use the server interface module 208 to upload the resultant encrypted data string 116, the encrypted suffix tree 118, and the encrypted dictionary 120 to the cloud servers 104.

The tokenization module 212 may generate a token, such as the encrypted query token 124 that encrypts a query pattern string, such as the query pattern string 122. The query pattern string 122 may be inputted onto the client device 102 by the user of the client device 102. Accordingly, the generation of a token by the tokenization module 212 may be defined as follows:

Token(K,p): To construct a token for a pattern $p = p_1 \ldots p_m$, output $$T = (\{T_{1,i} = F_{K_1}(p_1 \ldots p_i), T_{2,i} = F_{K_2}(p_1 \ldots p_i), T_{3,i} = \epsilon_{comp} \cdot \text{Token}(F_{K_3}(p_1 \ldots p_i), m-i+1)\}_{i=1}^{m})$$

in which $K_2$ and $K_3$ are random strings, $T_{1,i}$ are label keys, and $T_{2,i}$ and $T_{3,i}$ are secret keys. Accordingly, the tokenization module 212 may generate an encrypted query token that includes an encrypted entry of two secret keys for each symbol in a query string. Subsequently, the tokenization module 212 may upload the generated token to the cloud servers 104.

The verification module 214 may receive and decrypt an encrypted query result that is returned from the cloud servers 104, such as the candidate encrypted substring 126, and verify that the content of the encrypt query result actually matches the original query pattern string, such as the query pattern string 122. The verification module 214 may display the query result, such as the decrypted substring 128, to the user of the client device 102 if the query result is verified to match the query pattern string 122. Alternatively, if the query result does not actually match, the verification module 214 may present an indication to the user that no result is found. Further, if the cloud servers 104 were unable to return a query result based on a query pattern string, the verification module 214 may also present an indication to the user that no result is found.

Accordingly, the functions performed by the verification module 214 may be defined as follows:

Verify(K,A,p): If $A = \perp$, return −1. Otherwise, parse A as $c_i, \ldots, c_{i+m-1}$. For each $j = i, \ldots, i+m-1$, run $\epsilon \cdot \text{Dec}(K_4, c_j)$ to get $s_j$. If $s_{i+m-1} = p$, return i. Otherwise, return −1, in which $A = \perp$ indicates that no query result was returned from the cloud servers 104, and −1 corresponds to an indication of the lack of a query result based on the query pattern string.

In various embodiments, the verification module 214 may return the query result, such as the decrypted substring 128, along with information that indicates the location of the decrypted substring 128 within the original data string (e.g., index number from a beginning or an end of the data string 112). Additionally or alternatively, the verification module 214 may return the decrypted substring 128 in the context of additional symbols of the data string 112. For example, the client device 102 may present a segment of the data string 112 and highlight a portion that matches the decrypted substring 128. Otherwise, if the verification fails because the decrypted substring 128 is actually not a match to the query pattern, the verification module 214 may indicate to the user that a result matching the query pattern string 122 is not found.

The data store 216 may store data strings and query pattern strings that are inputted into the client device 102. The data store may further store the encrypted data strings, encrypted suffix trees and associated encrypted dictionaries, as well as tokens that include encrypted query pattern strings that are generated by the various modules of the client device 102. In some embodiments, such data may be deleted from the data store 216 following transfer to the one or more cloud servers 104. The data store 216 may also store query results (e.g., decrypted substring 128) that are received from the one or more cloud servers 104.

Example Cloud Servers

Figure 3:
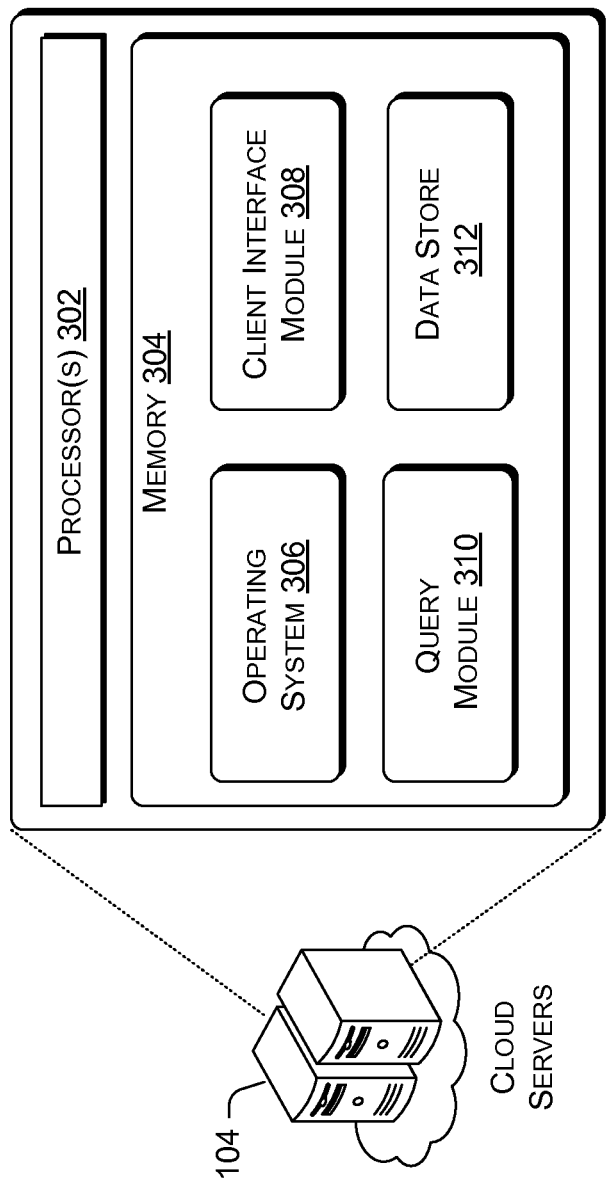
FIG. 3 is a block diagram of selected components of one or more cloud servers that implement server-side encrypted pattern matching.

FIG. 3 is a block diagram of selected modules of one or more cloud servers 104 that implement server-side encrypted pattern matching. The cloud servers 104 may include one or more processors 302, memory 304, and/or user controls that enable a user to interact with the device. The memory 304 may be implemented using computer storage media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media. Each of the cloud servers 104 may also include a network interface that enables the respective cloud server to communicate with other computing devices, such as other cloud servers and/or the client device 102, via the network 106.

The user controls of the cloud servers 104 may include, but are not limited to, combinations of one or more of keypads, keyboards, mouse devices, touch screens, microphones, speech recognition packages, and any other suitable devices or other electronic/software selection methods.

The memory 304 may store an operating system 306. The operating system 306 may include components that enable the cloud servers 104 to receive data via various inputs (e.g., user controls, network interfaces, and/or memory devices), and process the data using the one or more processors 302 to generate output. The operating system 306 may include one or more components that present the output (e.g., display an image on an electronic display, store data in memory, transmit data to another electronic device, etc.). Additionally, the operating system 306 may include other modules that perform various other functions generally associated with an operating system.

The memory 304 may also store modules that facilitate server-side encrypted pattern matching. The components, or modules, may include routines, programs instructions, objects, scripts, and/or data structures that perform particular tasks or implement particular abstract data types. The components may include a client interface module 308, a query module 310, and data store 312.

The client interface module 308 may receive encrypted data strings, encrypted suffix trees and associated encrypted dictionaries, as well as tokens that include encrypted query pattern strings from the client device 102. In turn, the client interface module 308 may store the encrypted data strings, encrypted suffix trees, and the associated encrypted dictionaries in the data store 312. The client interface module 308 may also pass the query pattern strings to the query module 310.

The query module 310 may perform encrypted pattern matching queries on the stored encrypted data strings using the received query pattern strings. For example, the query module 310 may use the encrypted query token 124 that corresponds to the query pattern string 122 to perform an encrypted pattern match query on the encrypted data string 116. In such an instance, the query is performed using the corresponding encrypted suffix tree 118 and the encrypted dictionary 120.

Accordingly, once again, assuming that $F:\{0,1\}^k \times \{0,1\}^* \to \{0,1\}^*$ is a pseudorandom function family, $\epsilon$=(Gen, Enc,Dec) is a symmetric key encryption scheme, and $\epsilon_{comp}$=(Gen,Token,Extract,Dec) is an integer comparison encryption scheme, then the function performed by the query module 310 may be defined as follows:

Query(T,CT): To evaluate a token T on a ciphertext CT (e.g., the encrypted data string 116), first parse T as ($\{T_{1,i}, T_{2,i}, T_{3,i}\}_{i=1}^m$), and CT as (C=($c_1, \ldots, c_n$), D). Query will traverse the suffix tree encrypted in D by performing the steps described below. Starting at i=1, (a) Look up $D(T_{1,i})$, i.e., the value stored in D with key $T_{1,i}$. If it is not found, Query returns A=$\perp$.

(b) Otherwise, parse $D(T_{1,i})$ as $(V_1, V_2)$. Let $l = V_1 \oplus T_{2,i}$. If $l \leq m$, then set i=l and return to step 1.

(c) Otherwise, run $\epsilon_{comp}\cdot\text{Extract}(T_{3,i}, l-i)$ to get an integer comparison token TK under secret key $T_{3,i}$ for l-i (equal to the length of the current edge e in the suffix tree).

(d) Run $\epsilon_{comp}\cdot\text{Dec}(TK, V_2)$ to get the start index $\text{ind}_e$.

(e) Return the answer A=($c_{ind_e}, \ldots, c_{ind_e+m-1}$).

The query function embodied in the above steps, as performed by the query module 310, is further illustrated below in FIG. 4.

Figure 4:
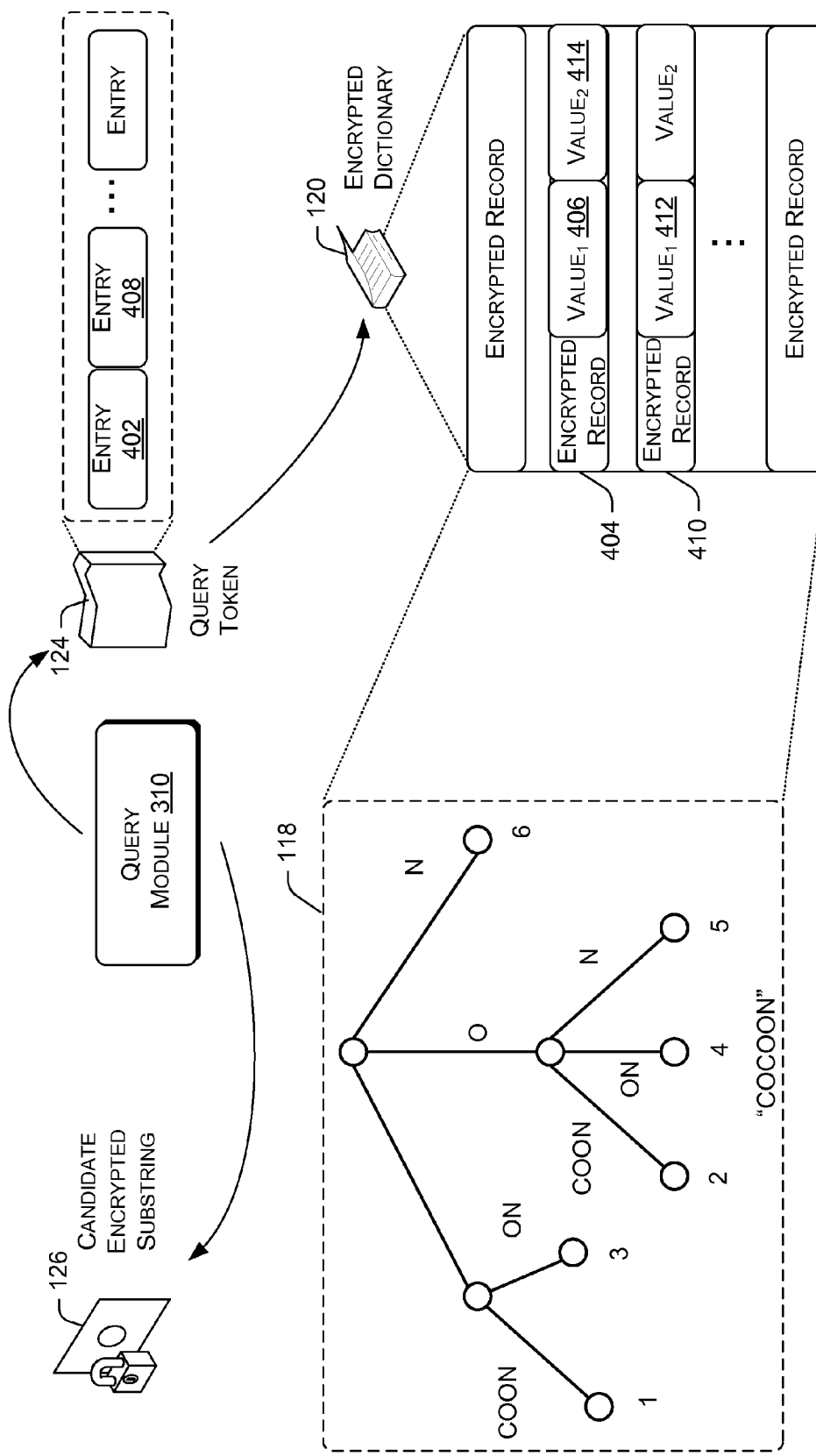
FIG. 4 is a schematic diagram that depicts the encrypted pattern matching query function performed by the query module of the cloud servers.

FIG. 4 is a schematic diagram that depicts the encrypted pattern matching query function performed by the query module 310 of the cloud servers 104. FIG. 4 further illustrates the query steps performed by the query module 310. As described above, the query module 310 may initially parse the encrypted query token 124 that includes a query pattern string 122 to obtain keys, $T_{1,i}$, $T_{2,i}$, $T_{3,i}$, for each entry of the encrypted query token 124 and parse the corresponding encrypted data string 116 into respective symbols using the encrypted dictionary 120. As described above, the encrypted dictionary 120 may store the values for the edges of the corresponding encrypted suffix tree 118 (non-limiting illustrative representation shown in FIG. 4).

Subsequently, the query module 310 may use the label key $T_{1,i}$ of a first encrypted entry 402 to attempt to look up an encrypted record 404 in the encrypted dictionary 120 that corresponds to the first symbol in the query pattern string 122. If such a corresponding encrypted record 404 with the label key $T_{1,i}$ of the first encrypted entry 402 is found in the encrypted dictionary 120, the query module 310 may use a second key of the first encrypted entry 402, i.e., $T_{2,i}$ that correspond to the label key $T_{1,i}$, to decrypt the record 404 and obtain a next entry value 406, e.g., $(|p_e\|e|+1) \oplus F_{K_2}(p_e\|e_1)$, which is the information that specifies the next encrypted entry (e.g., encrypted entry 408) in the encrypted query token 124 to consider, Accordingly, the query module 310 may determine if the next encrypted entry 408 specified by the next entry value 406 is located in the encrypted query token 124. If the query module 310 determines that the next encrypted entry 408 is found in the encrypted query token 124, the query module 310 may use the label key $T_{1,i}$ of the next encrypted entry 408 to look up a corresponding encrypted record, such as the encrypted record 410, in the encrypted dictionary 120. If the query module 310 is once again successful, the query module may use the second key of that entry in the token, i.e., $T_{2,i}$, to decrypt the second element of the encrypted record 410 and obtain a value 412 that specifies another next encrypted entry in the encrypted query token to consider. In this way, the query module 310 may proceed through the entries in the encrypted query token 124 until either the query module 310 is unable to locate an encrypted record in the encrypted dictionary 120 that corresponds to an encrypted entry in the encrypted query token 124, or the query module 310 is unable to locate an entry in the encrypted token 124 that corresponds to the next encrypted entry (e.g., encrypted entry 408). In the first case, the query module may return an indication that no query result is found to the client device 102. In the second case the query module 310 may end the particular query search based on the encrypted query token 124, and prepare to return as result as follows.

Once the query module 310 ends the particular query search, the query module 310 may use the second secret key $T_{3,i}$, from the most recent encrypted entry that is found in the encrypted token 124 t to decrypt an index position value (e.g., index position value 414) from a corresponding encrypted record of the encrypted dictionary 120. The decrypted index position value e.g., $\epsilon_{comp}\cdot\text{Enc}(F_{K_3}(p_e\|e_1), \text{ind}_e, |e|)$, may indicate the index position in the encrypted data string 116 that corresponds to the most recently found encrypted entry. Subsequently, by using this index position, the query module 310 may locate, extract, and return a candidate encrypted substring (e.g., candidate encrypted substring 126) from the encrypted data string 116 that has the same symbol length as the query pattern string 122. The returned candidate encrypted substring, also referred to as answer A, is a potential match for the query pattern string 122 of the encrypted query token 124.

While the query operations of the query module 310 are described above as being performed with the use of the encrypted dictionary 120, the query module 310 may alternatively perform the query operations by directly using the encrypted suffix tree 118 in a similar manner in other embodiments.

In additional embodiments, the answer A that is returned by the query module 310 may be accompanied by additional data, such as a predetermined numbers of symbols that precedes and/or follows the answer A. In this way, as described above, the verification module 214 of the client device 102 may eventually present the decrypted form of the candidate encrypted substring in the context of additional symbols of the data string 112. For example, the client device 102 may present a segment of the data string 112 and highlight a portion that matches the decrypted substring 128.

Thus, by using the encrypted dictionary 120, the query module 310 may locate a candidate encrypted substring of the encrypted data string 116 that potentially matches the encrypted query token 124. If a candidate encrypted sub string, such as the candidate encrypted substring 126 is found, the query module 310 may return the candidate encrypted substring to the client device 102. Otherwise, the query module 310 may return an indication that no query result is found to the client device 102.

Returning to FIG. 3, the data store 312 may store the encrypted data strings, encrypted suffix trees and associated encrypted dictionaries, as well as encrypted query tokens that include encrypted query pattern strings that are received from the client device 102. The data store 312 may also store other data objects that are used during the encrypted pattern matching, such as intermediate products that are calculated based on the encrypted data for the purpose of encrypted pattern matching.

The use of the encrypted data strings, encrypted suffix trees and associated encrypted dictionaries, as well as encrypted query tokens may enable the user of the client device 102 to perform server-side encrypted pattern matching on the cloud servers 104 without disclosing sensitive information to the cloud servers 104. For example, the pattern matching queries may be performed without revealing the encryption keys to the cloud servers 104, and further without the cloud servers 104 learning the query pattern strings of the pattern matching queries. Nevertheless, the cloud servers 104 may garner certain information, or leakages, as encrypted pattern matching is performed on a stored data string via a query pattern string. The leakage from each data string $L_1$ (s) may consist of n, which is the length of the string s. The leakage $L_2$ ($p_i$,s) from each encrypted query token for a query pattern string may consist of: $m_i$, which is the length of pattern $p_i$, the length of every edge traversed in the query, failure or success (if success, the start index in s), and the length of the longest prefix shared with each previous query $p_j$, j<i.

Example Processes

Figure 5:
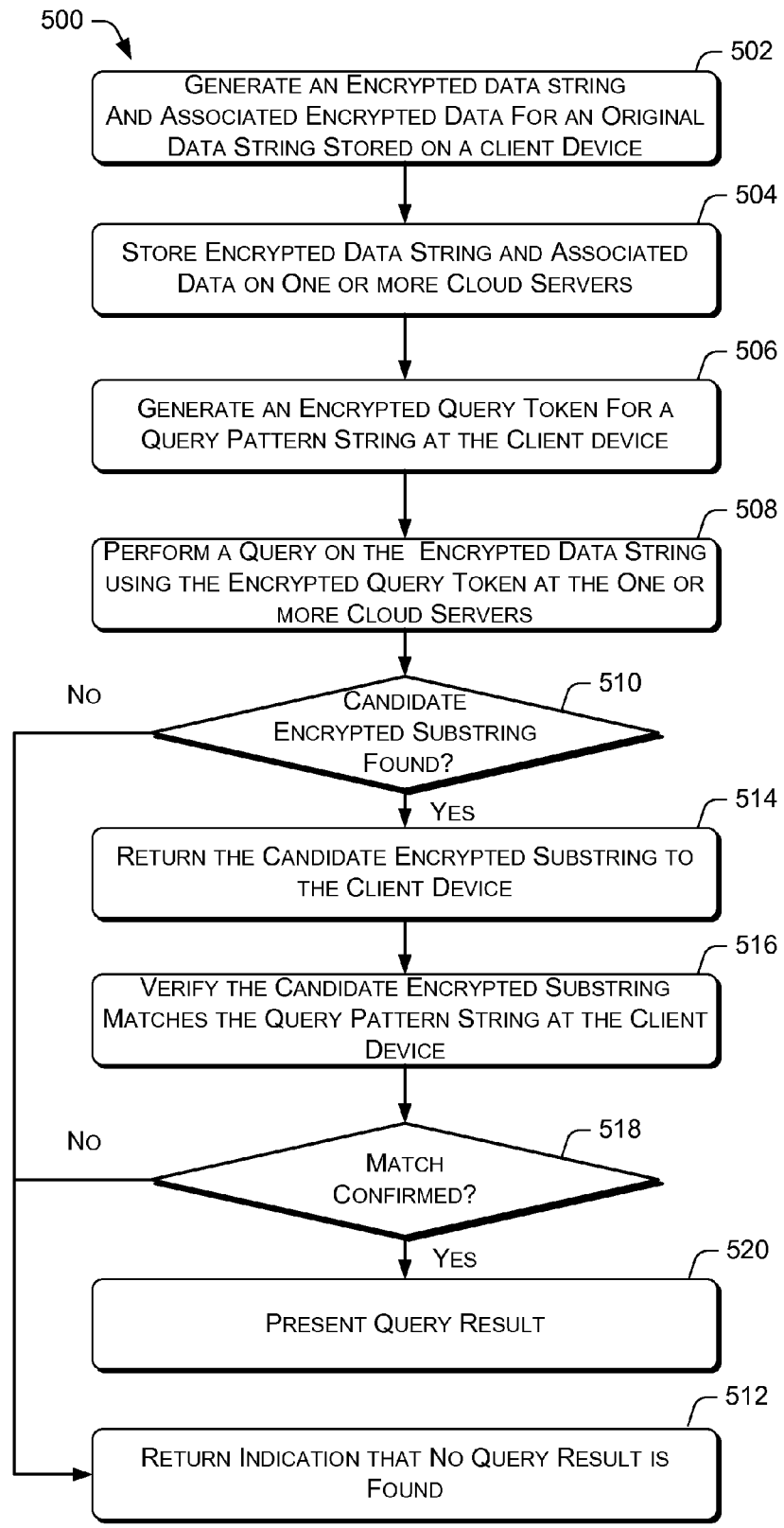
FIG. 5 is a flow diagram of an illustrative process to perform server-side encrypted pattern matching.
Figure 6:
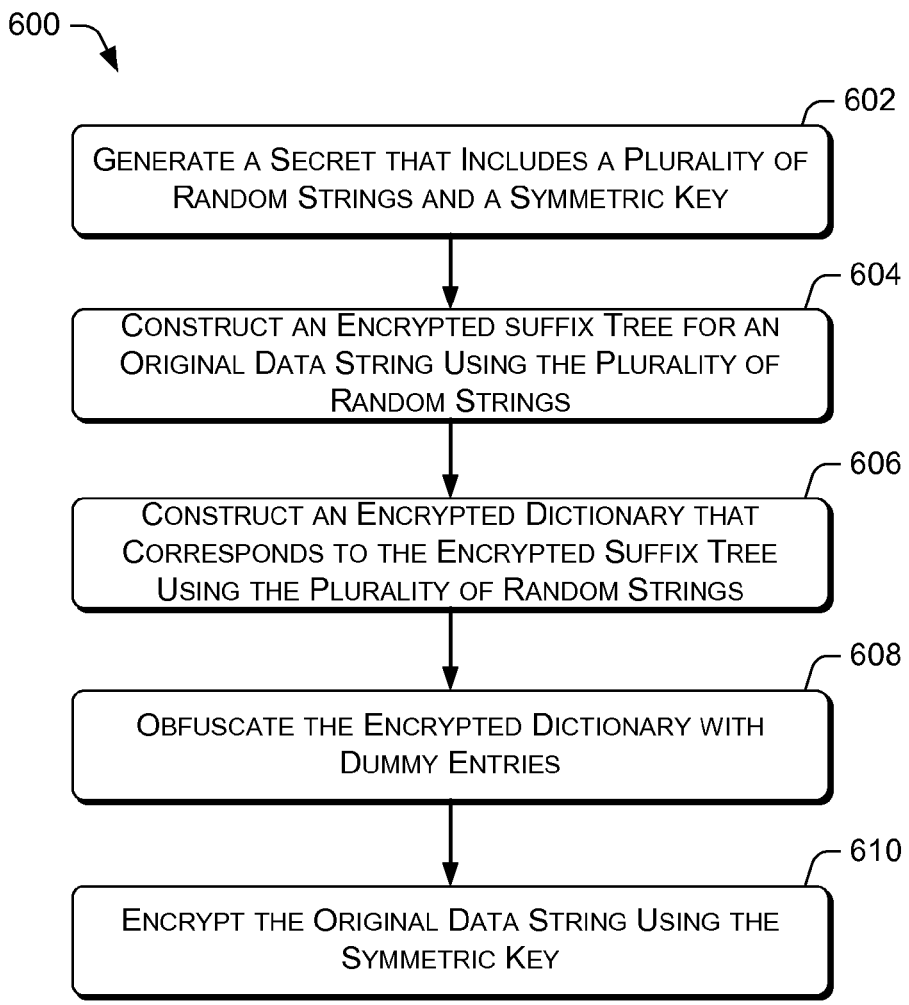
FIG. 6 is a block diagram of an illustrative process to perform the encryption of a data string.
Figure 7:
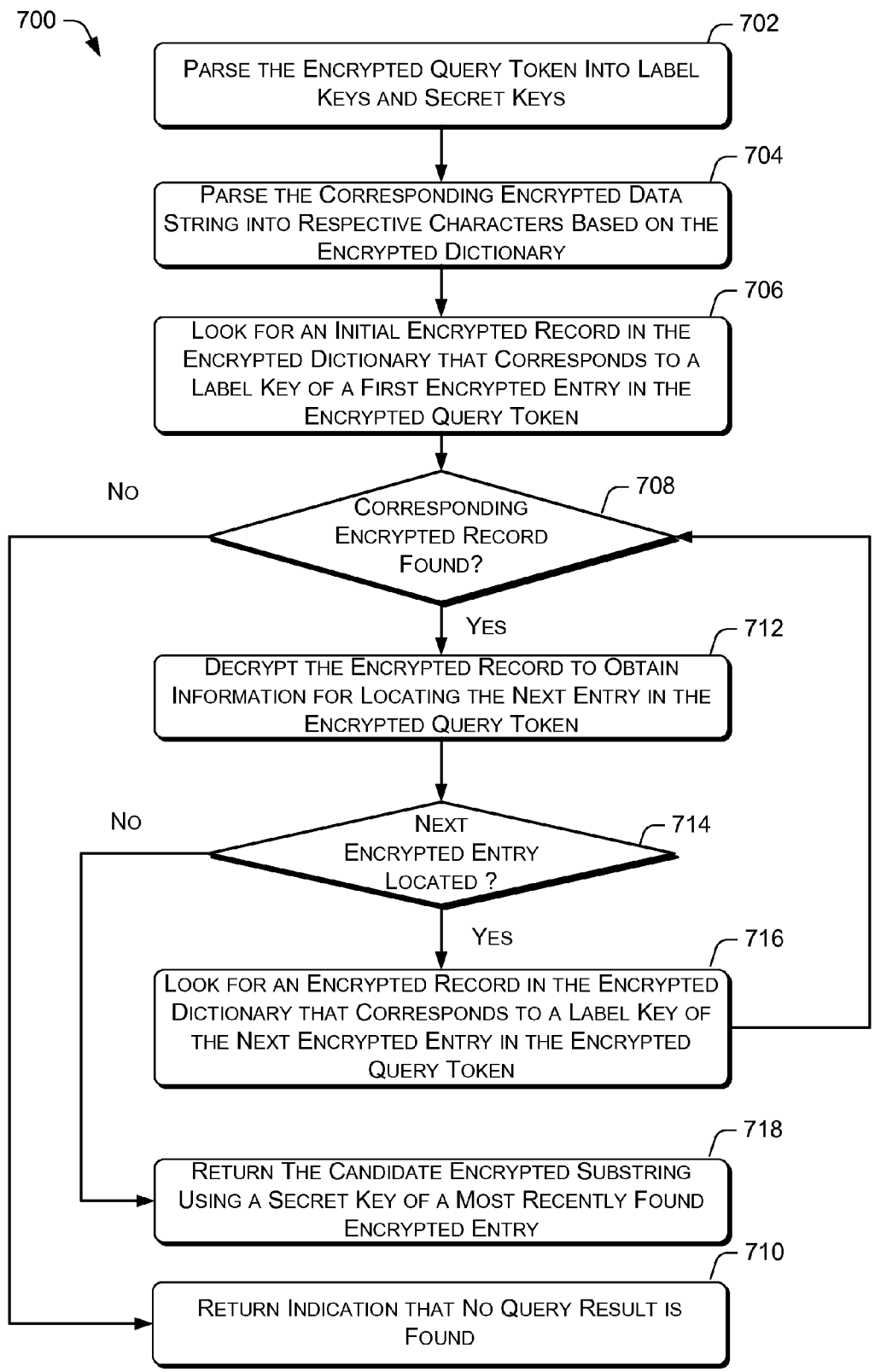
FIG. 7 is a block diagram of an illustrative process to perform a query on an encrypted data string using an encrypted query pattern string.

FIGS. 5-7 describe various example processes for implementing the server-side encrypted pattern matching techniques. The example processes are described in the context of the environment 100 of FIG. 1, but is not limited to that environment. The order in which the operations are described in each example process is not intended to be construed as a limitation, and any number of the described operations can be combined in any order and/or in parallel to implement each process. Moreover, the operations in each of the FIGS. 5-7 may be operations that can be implemented in hardware, software, and a combination thereof. In the context of software, the operations represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 5 is a flow diagram of an illustrative process 500 to perform server-side encrypted pattern matching. At 502, the encryption module 210 on the client device 102 may generate an encrypted data string 116 and associated encrypted data for an original data string 112. The associated encrypted data may include an encrypted suffix tree 118 and an encrypted dictionary 120. The encrypted suffix tree 118 and the encrypted dictionary 120 may be generated with the use of a CQA2-secure integer comparison encryption scheme and a symmetric encryption scheme. The encryption schemes may make use of randomly generated strings and a symmetric key. Additionally, the encrypted dictionary 120 may be provided with dummy entries that are generated using multiple random strings, the dummy entries serve to obfuscate information on the real edges of the encrypted suffix tree 118.

At 504, the client device 102 may send the encrypted data string 116 and the associated encrypted data to the one or more cloud servers 104 for storage. At 506, the client device 102 may use the tokenization module 212 to generate an encrypted query token 124 for a query pattern string 122 at the client device 102. The query pattern string 122 may be inputted into the client device 102 by a user. The tokenization module 212 may construct the encrypted query token 124 based on label keys $T_{1,i}$ and secret keys $T_{2,i}$ and $T_{3,i}$, and with the use of the symmetric key encryption scheme and the CQA2-secure integer comparison encryption scheme.

At 508, the client device 102 may transmit the encrypted query token 124 to the cloud servers 104. Upon receiving the encrypted query token 124 via the client interface module 308, the query module 310 of the cloud servers 104 may use the query pattern string 122 that is encoded in the encrypted query token 124 to perform a query on the encrypted data string 116. The query module 310 may perform the query with the use of the encrypted suffix tree 118 and/or the encrypted dictionary 120 that store the values for the edges of the corresponding encrypted suffix tree 118.

At decision 510, the query module 310 may determine whether a candidate encrypted substring 126 that potentially matches the query pattern string 122 encoded in the encrypted query token 124 is found in the encrypted data string 116. Thus, if the query module 310 determines that no candidate encrypted substring 126 is found ("no" at decision 510), the process 500 may proceed to 512. At 512, the query module 310 may return an indication to the client device 102 that shows that no query result is found. However, if the query module 310 determines that a candidate encrypted substring 126 is found ("yes" at decision 510), the process 500 may proceed to 514.

At 514, the query module 310 may use the client interface module 308 to send the candidate encrypted substring 126 to the client device 102. At 516, upon receiving the candidate encrypted substring 126 via the server interface module 208, the client device 102 may use the verification module 214 to decrypt the candidate encrypted substring 126 into the decrypted substring 128. Further, verification module 214 may verify that the decrypted substring 128 actually matches the query pattern string 122 that is in the encrypted query token 124.

At decision 518, if the verification module 214 determines that the decrypted substring 128 matches the query pattern string 122 ("yes" at decision 518), the process 500 may proceed to 520. At 520, the verification module 214 may present the query result to the user of the client device 102. The query result may include the decrypted substring 128. In some embodiments, the query result may also include information that indicates the location of the decrypted substring 128 within the data string 112 (e.g., index number from a beginning or an end of the data string 112). In other embodiments, the verification module 214 may also return the decrypted substring 128 in the context of additional symbols of the data string 112. For example, the verification module 214 may present a segment of the data string 112 and highlight a portion that matches the decrypted substring 128.

However, if the verification module 214 determines that the decrypted substring 128 does not match the query pattern string 122 at decision 518 ("no" at decision 518), the process 500 may loop back to 512, at which point the verification module 214 on the client device 102 may present an indication that shows that no query result is found.

FIG. 6 is a block diagram of an illustrative process 600 to perform the encryption of a data string. The process 600 may further illustrate 502 of the process 500. At 602, the encryption module 210 may generate a secret 114 that includes one or more random strings (e.g., k-bit strings $K_1$, $K_2$, $K_3$,) and a symmetric key (e.g., key $K_4 \leftarrow \epsilon \cdot \text{Gen}(1^k)$). At 604, the encryption module 210 may construct an encrypted suffix tree 118 for an original data string 112 based on the one or more random strings of the secret 114 using a CQA2-secure integer comparison encryption scheme and a symmetric key scheme.

At 606, the encryption module 210 may construct an encrypted dictionary 120 that corresponds to the encrypted suffix tree 118. The encrypted dictionary 120 may be constructed based on the one or more random strings of the secret using a CQA2-secure integer comparison encryption scheme and a symmetric encryption scheme. At 608, the encryption module 210 may further obfuscate the encrypted dictionary 120 with additional dummy entries. The dummy entries serve to obfuscate the real edges of the encrypted suffix tree 118.

At 610, the encryption module 210 may encrypt the original data string 112 symbol-wise based on the symmetric key using a symmetric encryption scheme. The result of the symmetric key encryption is a ciphertext in the form of the encrypted data string 116.

FIG. 7 is a block diagram of an illustrative process 700 to perform a query on an encrypted data string using an encrypted query pattern string. The process 700 may further illustrate 508 of the process 500. At 702, the query module 310 on the one or more cloud servers 104 may parse the encrypted query token 124 to obtain label keys and secret keys for the one or more entries in the encrypted query token 124. At 704, the query module 310 may parse the corresponding encrypted data string into respective symbols based on the encrypted dictionary 120.

At 706, the query module 310 may look for an initial encrypted record (e.g., encrypted record 404) in the encrypted dictionary 120 that corresponds to a label key of a first encrypted entry in the encrypted query token 124. At decision 708, the query module 310 may determine whether the initial encrypted record is found in the encrypted dictionary 120. If the query module 310 determines that the initial encrypted record is not found ("no" at decision 708), the process 700 may proceed to 710. At 710, the query module 310 may return an indication to the client device 102 that no query result is found.

However, if the query module 310 determines that the initial encrypted record is found ("yes" at decision 708), the process 700 may proceed to 712. At 712, the query module 310 may decrypt a next entry value (e.g., next entry value 406) stored in the encrypted record using a secret key in the corresponding encrypted entry of the encrypted query token 124. The next entry value contains information for locating a next encrypted entry (e.g., encrypted entry 408) in the encrypted query token 124.

At decision 714, the query module 310 may determine whether the next encrypted entry indicated by the next entry value is located in the encrypted query token 124. If the query module 310 is able to locate the next encrypted entry in the encrypted query token 124 ("yes" at decision 714), the process 700 may proceed to 716. At 716, the query module 310 may look for a subsequent encrypted record in the encrypted dictionary 120 that corresponds to a label key of the next encrypted entry in the encrypted query token 124. Subsequently, the process 700 may loop back to 708, so that the query module 310 may determine whether the subsequent encrypted record is found in the encrypted dictionary 120 to continue executing the query search. As such, during any loop back to 708, a failure to locate an encrypted record for any of the one or more subsequent encrypted entries in the encrypted query token 124 may cause the process 700 to loop back to 710, so that the query module 310 may return an indication to the client device 102 that no query result is found.

Returning to 714, if the query module 310 is unable to locate the next encrypted entry in the encrypted query token 124 ("no" at decision 714), the process 700 may proceed to 718.

At 718, the query module 310 may return a candidate encrypted substring, such as the candidate encrypted substring 126. The query module 310 may return the candidate encrypted substring 126 by using a secret key of the most recently found encrypted entry to decrypt an index position value (e.g., index position value 414) in a corresponding encrypted record. The query module 310 may then use the index position value to locate a corresponding symbol in the encrypted data string 116. Thus, a candidate encrypted substring 126 from this corresponding symbol to an ending symbol at a symbol length that is the same as the symbol length of the query pattern string 122 may be return by the query module 310 to the client device 102.

By implementing the server-side encrypted pattern matching techniques described herein, owners of data strings may benefit from the virtually limitless storage capacity and data backup protection of the cloud servers to store data strings while minimizing the risk of data theft due to server breach and/or unauthorized data access.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer-readable device storing computer-executable instructions that, when executed by the computer-readable device, cause one or more processors to perform operations comprising:
receiving a data string that includes a plurality of symbols;
generating a secret that includes one or more random strings and a symmetric key;
generating an encrypted suffix tree based on the data string;
constructing an encrypted dictionary that includes information on edges of the encrypted suffix tree for the data string based on the one or more random strings using an integer comparison encryption scheme and a symmetric key scheme;
encrypting each of the plurality of symbols symbol-wise based on the symmetric key using a symmetric encryption scheme to produce an encrypted data string; and
outputting the encrypted dictionary, the encrypted suffix tree, and the encrypted data string, wherein each encrypted entry in the encrypted dictionary corresponds to a respective edge of the encrypted suffix tree.

2. The computer-readable device of claim 1, further comprising propagating the encrypted dictionary with dummy entries to obfuscate information regarding number of edges in the encrypted suffix tree.

3. The computer-readable device of claim 2, wherein the propagating includes creating a dummy entry by choosing random strings $R_1, R_2, R_3, R_4$ and storing $(R_2, \epsilon_{comp}.\text{Enc}(R_3, R_4, 1))$ with search key $R_1$, in which $\epsilon_{comp}.\text{Enc}$ is an encryption algorithm of the integer comparison encryption scheme.

4. The computer-readable device of claim 2, wherein $|\{e\}|$ is a number of edges in the encrypted suffix tree, and $2n-|\{e\}|$ is a number of the dummy entries, so that the encryption dictionary contains $2n$ total number of entries.

5. The computer-readable device of claim 1, further comprising generating an encrypted query token that includes a query pattern string for comparison with the encrypted data string.

6. The computer-readable device of claim 5, wherein the generating the encrypted query token is defined as Token(K, p) that constructs a token for a pattern $p=p_1 \ldots p_m$ by outputting $$T=(\{T_{1,i}=F_{K_1}(p_1 \ldots p_i), T_{2,i}=F_{K_2}(p_1 \ldots p_i), T_{3,i}=\epsilon_{comp}.\text{Token}(F_{K_3}(p_1 \ldots p_i), m-i+1)\}_{i=1}^m))$$

in which $K_2$ and $K_3$ are random strings, and $\epsilon_{comp}.\text{Token}$ is a tokenization algorithm of the integer comparison encryption scheme.

7. The computer-readable device of claim 5, further comprising:
- decrypting a candidate encrypted substring into a decrypted substring, the candidate encrypted substring being extracted from the encrypted data string using the encrypted query token;
- verifying the candidate encrypted substring is identical to the query pattern string;
- presenting an indication that no query result is found when the decrypted substring is not identical to the query pattern string; and
- presenting the decrypted substring when the decrypted substring is identical to the query pattern string.

8. The computer-readable device of claim 1, wherein the integer comparison encryption scheme is a CQA2-secure scheme.

9. The computer-readable device of claim 1, wherein the each encrypted entry stores a search key for locating the encrypted entry, a first value for an encryption of a length of a prefix through an edge, and a second value for the encryption of an index position of a first occurrence of a corresponding substring to the edge.

10. The computer-readable device of claim 9, wherein the search key is stored as $F_{K_1}(p_e\|e_1)$, in which $K_1$ is random string, $p_e$ denote a string on a path from a root to an edge e, $F_{K_1}$ is a pseudorandom function.

11. The computer-readable device of claim 9, wherein the first value and the second value are stored as $((|p_e\|e|+1) \oplus F_{K_2}(p_e\|e_1), \epsilon_{comp}\cdot Enc(F_{K_3}(p_e\|e_1), ind_e, |e|))$, in which $K_2$ and $K_3$ are random strings, $p_e$ denotes a string on a path from a root to an edge e, $F_{K_2}$ and $F_{K_3}$ are pseudorandom functions, $ind_e$ denotes a start index in the data string of a first occurrence of a substring $p_e\|e$, $\epsilon_{comp}\cdot Enc$ is an encryption algorithm of the integer comparison encryption scheme.

12. A method, comprising:
- receiving an encrypted query token from a client device that includes a query pattern string for comparison with an encrypted data string at one or more cloud servers;
- parsing the encrypted query token to obtain label keys and secret keys;
- parsing the encrypted data string into a plurality of symbols based on an encrypted dictionary;
- locating encrypted records in the encrypted dictionary that corresponds to the label keys of the plurality of symbols in the encrypted query token using an encrypted suffix tree;
- returning a candidate encrypted substring to the client device when a corresponding encrypted record for each of the label keys is located in the encrypted dictionary; and
- returning an indication that no query result is found to the client device when a corresponding encrypted record for each of the label keys is not located in the encrypted dictionary.

13. The method of claim 12, wherein the locating the encrypted records includes locating a next encrypted entry in the encrypted query token using information that is extracted from an encrypted record of the encrypted dictionary via one of the secret keys.

14. The method of claim 12, wherein each of the encrypted records include an index position in the encrypted data string that corresponds to each encrypted record and information for locating a next encrypted entry in the encrypted query token.

15. The method of claim 14, wherein the returning a candidate encrypted substring includes using an index position in the encrypted data string that corresponds to a first symbol in the plurality of symbols to extract the candidate encrypted substring from the encrypted data string.

16. The method of claim 12, wherein the encrypted suffix tree and the encrypted dictionary are generated for the encrypted data string based on one or more random strings using an integer comparison encryption scheme.

17. The method of claim 12, wherein the encrypted data string is produced from an unencrypted data string by encrypting each of the plurality of symbols symbol-wise based on a symmetric key using a symmetric encryption scheme.

18. The method of claim 12, wherein the encrypted dictionary includes dummy entries that obfuscate information regarding number of edges in the encrypted suffix tree.

19. A server, comprising:
- one or more processors; and
- a memory that includes components that are executable by the one or more processors, the components comprising:
  - an interface component to receive an encrypted query token from a client device that includes a query pattern string for comparison with an encrypted data string; and
  - a query component to find a match for the encrypted query token in the encrypted data string without decrypting the encrypted data string and the encrypted query token by using an encrypted dictionary that includes information on edges of an encrypted suffix tree and the encrypted suffix tree to locate encrypted entries in the encrypted dictionary that correspond to label keys of a plurality of symbols in the encrypted query token.

20. The server of claim 19, wherein the query component is to further return a candidate encrypted sub string to the client device when a corresponding encrypted record for each of the label keys is located in the encrypted dictionary or return an indication that no query result is found to the client device when a corresponding encrypted record for each of the label keys is not located in the encrypted dictionary.

* * * * *